United States Patent [19]

Jurkewitz

[11] Patent Number: 5,146,173
[45] Date of Patent: Sep. 8, 1992

[54] POSITION DETERMINING DEVICE

[75] Inventor: Manfred Jurkewitz, Wiesloch, Fed. Rep. of Germany

[73] Assignee: Heidelberger Druckmaschinen AG, Heidelberg, Fed. Rep. of Germany

[21] Appl. No.: 461,620

[22] Filed: Jan. 8, 1990

[30] Foreign Application Priority Data

Jan. 7, 1989 [DE] Fed. Rep. of Germany ....... 3900270

[51] Int. Cl.$^5$ .................. G08C 13/00; G01R 27/02
[52] U.S. Cl. ............................. 324/714; 324/704; 340/870.38
[58] Field of Search ............... 324/714, 725, 704; 340/870.38, 660, 825.78

[56] References Cited

U.S. PATENT DOCUMENTS

| | | | |
|---|---|---|---|
| 2,351,016 | 6/1944 | Deakin | 340/825.78 |
| 2,905,385 | 9/1959 | Larse | 340/870.38 |
| 3,541,445 | 11/1970 | Taylor et al. | 340/825.78 |
| 3,827,037 | 7/1974 | Willoughby | 340/870.38 |
| 4,122,390 | 10/1978 | Kollitz et al. | 324/714 |
| 4,386,531 | 6/1983 | Heimgartuer et al. | |
| 4,572,951 | 2/1986 | Toda et al. | 341/15 |
| 4,803,420 | 2/1989 | Steinbreeher et al. | 340/870.38 |
| 4,884,070 | 11/1989 | Hannaford | 340/870.38 |
| 4,987,372 | 1/1991 | Ofori-Tenkorang et al. | 324/705 |

FOREIGN PATENT DOCUMENTS

| | | |
|---|---|---|
| 3204807 | 11/1982 | Fed. Rep. of Germany . |
| 3328810 | 6/1984 | Fed. Rep. of Germany . |
| 3325318 | 1/1985 | Fed. Rep. of Germany . |
| 3246959 | 6/1985 | Fed. Rep. of Germany . |
| 3407102 | 9/1985 | Fed. Rep. of Germany . |
| 3433585 | 6/1986 | Fed. Rep. of Germany . |
| 252582 | 12/1987 | German Democratic Rep. . |

OTHER PUBLICATIONS

Fed. Rep. of Germany, Publication, "Siemens & Halshe Aktiengesellschaft", Schp/GB 31.8.65, PA 9/510/2001, article, Schellautrieb fuer Potentiometer, pp. 1-6 and 1 drawing; (no translation).

*Primary Examiner*—Kenneth A. Wieder
*Assistant Examiner*—Muura K. Regan
*Attorney, Agent, or Firm*—Herbert L. Lerner; Laurence A. Greenberg

[57] ABSTRACT

A position determining device for an adjustment device including two continuous potentiometers having sliders movable to respective positions determininng respective resistance values of the potentiometers, the sliders being coupled with the adjustment drive so that the respective resistance values determined by the positions of the sliders correspond to a set position of the adjustment drive, a device for driving each of the sliders with a transmission ratio different from one another so that the potentiometers have a resistance value different from one another for a given set position of the adjustment drive, and a device for establishing a differential value from the different resistance values as a measure of the set position of the adjustment drive.

8 Claims, 5 Drawing Sheets

POSITION DETERMINING DEVICE

The invention relates to a position determining device and, more particularly, to such a device for determining the positioning of an adjustment drive, or similar mechanism, especially in printing machines, the device having at least one potentiometer with a slider which is couplable to the adjustment drive, a resistance value determined by a set position of the slider representing a measurement for the respective positioning.

Positioning tasks have to be performed quite frequently in various fields of technology. For example, an adjustment drive used for this purpose may include an electric motor driving a spindle which linearly displaces a control element. In offset printing machines, for example, there is a problem of adjusting individual ink zones to correspond to respective ink demands. For this purpose, the size of each of the ink zone apertures is set by means of an adjustment drive from the control panel of the printing machine. The position of the respective control element is determined from a potentiometer which is coupled to the element, the position of the slider of the potentiometer and thereby the value of the existing resistance represent a measure of the position of the control element. In order to maintain maximum resolution, ten-turn potentiometers are used. This heretofore known construction and procedure has proven itself in practice; however, even greater precision for positioning tasks would be desirable. Furthermore, a disadvantage of these heretofore known constructions is that the potentiometers used until now are mechanically destroyed if the sliders move beyond the end position thereof. It is therefore always necessary not to move the slider beyond a safe distance from the end positions thereof. This means that the resistance assembly cannot be exploited to its fullest.

It is accordingly an object of the invention to provide a position determining device of the aforementioned general type which affords a greater degree of precision in determining the position, and which is, furthermore, not subject to any mechanical limitations.

With the foregoing and other objects in view, there is provided, a position determining device for an adjustment device comprising two continuous potentiometers having sliders movable to respective positions determining respective resistance values of the potentiometers, the sliders being coupled with the adjustment drive so that the respective resistance values determined by the positions of the sliders correspond to a set position of the adjustment drive, means for driving each of the sliders with a transmission ratio different from one another so that the potentiometers have a resistance value different from one another for a given set position of the adjustment drive, and means for establishing a differential value from the different resistance values as a measure of the set position of the adjustment drive. Because continuous potentiometers are used, there cannot be any mechanical limitation. On the contrary, the sliders of such potentiometers may be rotated through 360 degrees, so that they return to their original position after a complete revolution. The arrangement is such that when a control element is moved, the sliders of the potentiometers are also moved, yet an asynchronism occurs between the two slider movements due to the differing ratios of transmission. The resistance values of the two potentiometers therefore assume different magnitudes, according to the position of the control element, so that the difference between these magnitudes can be evaluated as a measure of the position. A desired resolution and precision can be established by suitably selecting the ratios of transmission. Over the entire positioning range, the aim is always for the number of revolutions of the slider of the one potentiometer to be one revolution less than the number of revolutions of the slider of the other potentiometer. The ratio of transmission between the potentiometers must be selected accordingly.

In accordance with another feature of the invention, the potentiometers are constructed as single-pass potentiometers. In such single-pass potentiometers, the slider returns to its original position after one complete rotation of 360 degrees. In accordance with a further feature of the invention, a ratio of transmission r between the two potentiometers is:

$$r = \frac{n1}{n2}, \text{ and } n1 = x \text{ and } n2 = x - 1 \text{ so that}$$

$$r = \frac{n1}{n1 - 1} = \frac{x}{x - 1},$$

wherein n1 represents the number of revolutions of the slider of one of the potentiometers, n2 represents the number of revolutions of the slider of the other potentiometer, and x represents a maximum number of complete revolutions of the adjusting device for a maximum adjusting stroke.

The foregoing equation may be explained more clearly by way of two examples:

when x=10
there results a ratio of transmission of:

$$r = \frac{n1}{n2} = \frac{x}{x - 1} = \frac{10}{9} = 1.1$$

This means that the maximum adjustment stroke corresponds to 10 revolutions of the first potentiometer, while the second potentiometer only undergoes 9 revolutions as a result of this stroke, so that there is a difference of one revolution over the entire adjustment range.

when x=100
there results a ratio of transmission of $$r = \frac{100}{99} = 1.\overline{01}$$

so that, for 100 revolutions of the slider of the first potentiometer, the slider of the second potentiometer only completes 99 revolutions, the 100 revolutions thus corresponding to the maximum adjustment stroke of the adjustment drive.

Consequently, the slider of the second potentiometer trails behind the slider of the first potentiometer in such a way that the lagging interval is equal to precisely one complete revolution relative to the full range of adjustment.

In accordance with an added feature of the invention, the potentiometers, respectively, have connection regions at a starting location and at an end location of respective full measurement ranges thereof, both of the potentiometers having respective drive ratios operative so that only one of the sliders at any time is located in a respective connection region of the respective potentiometer except at a start and an end of the entire measurement range. Thus, the two sliders are not located simultaneously in the respective connection regions of the relevant potentiometer. Assurance is thereby provided that the relevant position of the adjustment drive and the control element, respectively, can always be determined unequivocally in relation to the respective differential resistance value which is determined.

In accordance with an additional feature of the invention, there are provided an analog-to-digital converter connected to the potentiometers for receiving the resistance values therefrom, and a computer connected to the analog-to-digital converter for evaluating the position of the adjustment device from the digitized resistance values.

The digital values which are then available to the computer are evaluated with respect to the position of the adjustment drive using stored tables or functions.

In accordance with yet another feature of the invention, there is provided a device including a constant voltage source connected to the potentiometers for registering a respective voltage corresponding to the resistance values, and means for determining a difference of the respective voltage values as a measure of the set position of the adjustment drive. Consequently, the resistance values as such are then not processed for evaluation, but rather the voltage values which are registered from the sliders as voltage drops, for example, over the resistances.

In accordance with a concomitant feature of the invention the set position of the adjustment drive is determinable in accordance with the following:

$$\text{Position (degrees)} = (U1 \{\text{volts}\} - U2 \{\text{volts}\}) \times \text{gradient}\left(\frac{\text{degrees}}{\text{volts}}\right) + \text{constant (degrees)}$$

wherein u1 is the voltage of one of the potentiometers, u2 is the voltage of the other potentiometer, and the gradient and the constant are respective preset values depending upon whether u1 is greater or smaller than u2, and whether u1 or u2 is equal to 0 or u max, or is not equal to 0.

Other features which are considered as characteristic for the invention are set forth in the appended claims.

Although the invention is illustrated and described herein as embodied in a position determining device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

Figure 1:
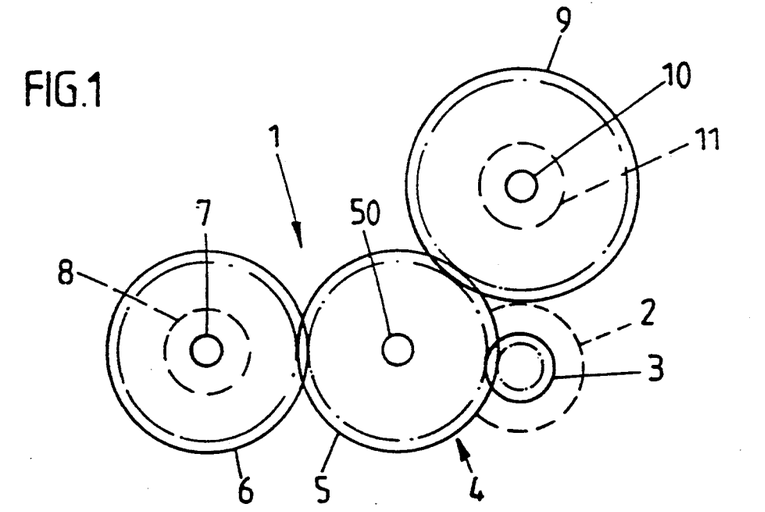
FIG. 1 is a diagrammatic view of the position-determining device according to the invention.

Referring now to the drawing and, first, particularly to FIG. 1 thereof, there is shown diagrammatically therein an adjustment drive 1 for positioning a non-illustrated control element. The adjustment drive 1 has a motor with a drive or output shaft which is connected to a gear wheel 3. The gear wheel 3 is a component of a spur-gear drive unit 4, and meshes with a gear wheel 5 which is part of the spur-gear drive unit 4 and is connected to a threaded spindle 50. The threaded spindle extends into a non-illustrated threaded bore hole formed in the control element; a consequence thereof is that rotation of the gear wheel 5 and, thereby, of the threaded spindle 50 results in a linear relocation of the control element, the complete range of adjustment (linear adjustment stroke) being, for example, equal to 120 mm. The gear wheel 5 meshes with a gear wheel 6, which is connected via a shaft 7 to a slider of a first potentiometer 8. Furthermore, another gear wheel 9, meshing with the gear wheel 5, drives a slider of a second potentiometer 11 via a shaft 10. In the foregoing arrangement of gear wheels the gear wheel 3 has ten teeth, the gear wheel 5 has forty teeth. The gear wheel 6 also has forty teeth, and the gear wheel 9 has 44 teeth. This means that the gear wheel 5 turns through 360 degrees when the motor 2 has performed four revolutions. One revolution of the gear wheel 5 also corresponds to one revolution of the gear wheel 6, because both of the gear wheels 5 and 6 have the same number of teeth. One revolution of the gear wheel 5 corresponds to only a partial revolution of the gear wheel 9, because the latter is entrained at a reduced speed with respect to the gear wheel 5.

Accordingly, the ratio of transmission r of the revolutions n1 of the slider of the first potentiometer 8 to the revolutions n2 of the slider of the potentiometer 11 is:

$$r = \frac{n1}{n2}$$

According to the invention, the arrangement is such that in the case where n1=x:

$$n2 = x - 1$$

wherein x is the maximum number of complete revolutions of the adjustment drive for a maximum adjustment stroke. In the example presented, the maximum adjustment stroke is 120 mm, which is to be traversed with ten revolutions of the gear wheel 5. This means that one revolution of the spindle 50 results in a displacement of the control element by 12 mm. When the entire adjustment stroke is traversed or passed through, the slider of the potentiometer 8 will have accordingly completed ten revolutions, whereas the following applies to the number of revolutions of the slider of the potentiometer 11:

$$n2 = \frac{n1}{r} \text{ where}$$

$$r = \frac{z2}{z1}$$

and z1=the number of teeth on the gear wheel 5 or the gear wheel 6, and z2=the number of teeth on the gear wheel 9. This results in:

$$r = \frac{44}{40} = 1.1 \text{ and}$$

$$n2 = \frac{n1}{1.1} = \frac{10}{1.1} = 9.09$$

From the foregoing description, it appears to be apparent that, over the complete adjustment stroke, the slider of the potentiometer 11 lags behind the total revolutions of the slider of the potentiometer 8 by approximately one revolution. The arrangement is accordingly adjusted so that, at the start of the complete adjustment stroke, the two sliders of the potentiometers 8 and 11 assume the same position, i.e. their zero position, which means that the resistance value between the slider and the relevant connection of the resistance assembly is 0 Ohms.

Figure 2:
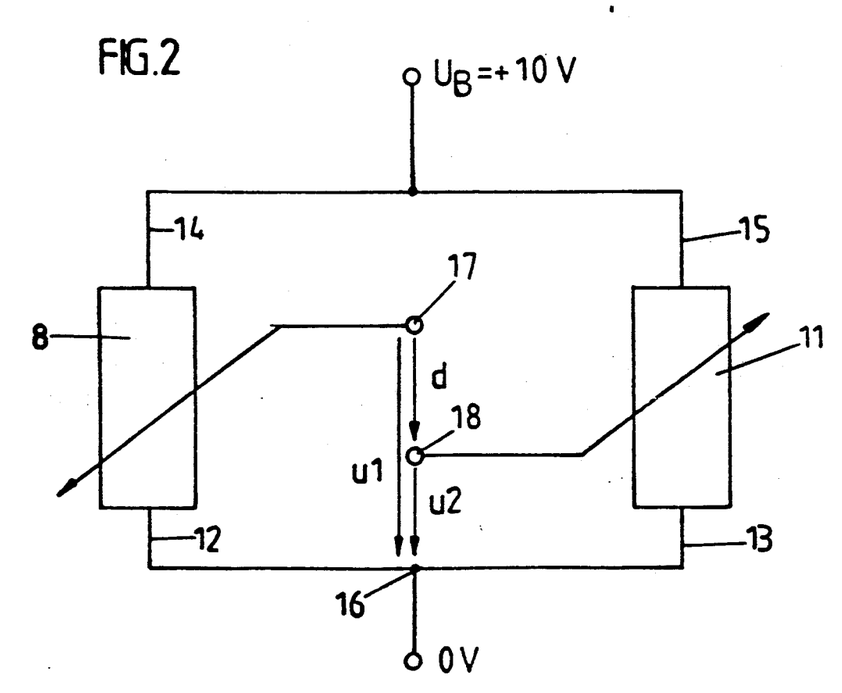
FIG. 2 is a block circuit diagram of the device.

FIG. 2 shows the electrical connection of the potentiometers 8 and 11. Beginning connections 12 and 13 of the potentiometers 8 and 11 are at 0 volts, and end connections 14 and 15 of the potentiometers 8 and 11 are at u max=plus 10 volts of a constant voltage source Ub. The beginning connection 12 is brought together with the beginning connection 13 and the 0-volt terminal of the constant voltage source Ub at a point 16. Between a connection 17 of the slider of the potentiometer 8 and the point 16, the voltage is U1, and between a connection 18 of the slider of the potentiometer 11 and the point 16, the voltage is U2. The differential value d corresponds to the voltage differential between the connections 17 and 18, and is accordingly measured as:

$$d = U1 - U2$$

From this it is clear that, when the maximum adjustment stroke of the arrangement is traversed in accordance with FIG. 1, the positions of the sliders of the potentiometers 8 and 11 are constantly divergent due to the varying ratios of transmission to the control element; a result thereof is that a corresponding differential value d will be formed between the connections 17 and 18.

Figure 3:
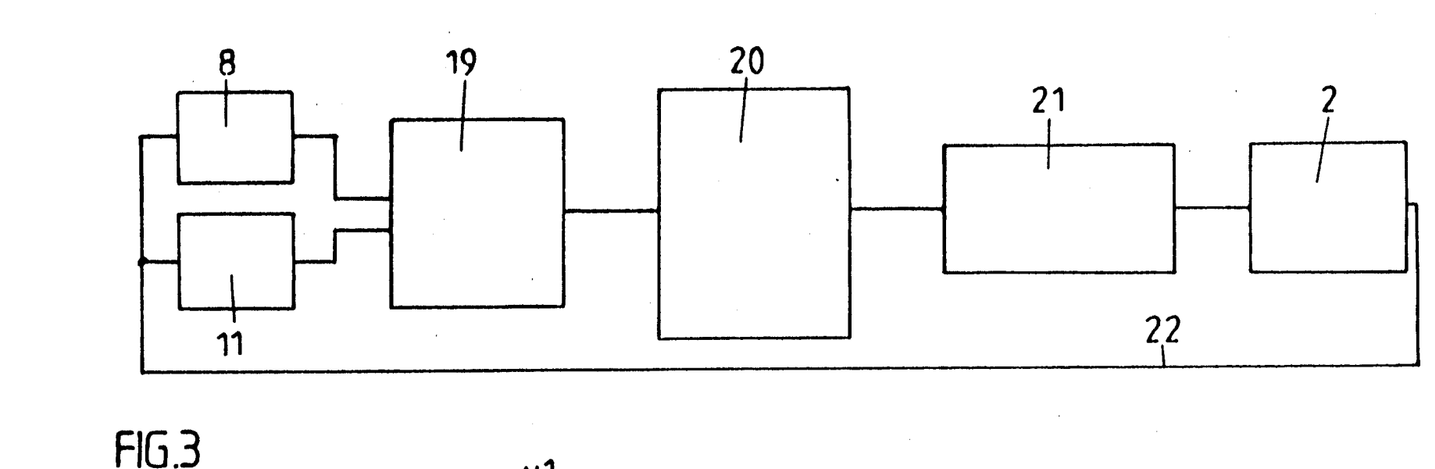
FIG. 3 is a block circuit diagram of a complete assembly including the position-determining device, an a-d converter, a computer, a power unit and a motor.

FIG. 3 shows the overall construction of the device according to the invention, which includes the adjustment drive 1 of FIG. 1. As is readily apparent, voltages U1 and U2 corresponding to the resistance values of the potentiometers 8 and 11 are fed to an analog-digital converter 19, which has a digital output connected to a computer 20. The computer 20 is, in turn, connected to a power unit 21, which supplies the motor 2. As shown in FIG. 1, the motor 2 is mechanically connected to the potentiometers 8 and 11. This is represented diagrammatically in FIG. 3 by an operative connection line 22.

Voltages U1 and U2 corresponding to the positions or settings of the potentiometers 8 and 11, are fed via the a–d converter 19 to the computer 20, which determines therefrom the position or setting of the adjustment drive, and hence the position of the non-illustrated control element, as described in greater detail hereinbelow. If this actual setting is different from a nominal or setpoint value, then the power unit 21 is activated so as to drive the motor 2 in a manner that, in accordance with a closed-loop control circuit, the control element is moved into an actual position thereof which corresponds to the setpoint position. As a result of this relocation or displacement, the potentiometers 8 and 11 are also moved, so that the computer 20 recognizes by a comparison of the actual and setpoint values that there is no longer any divergence; accordingly, the power unit 21 stops driving the motor 2.

Figure 4:
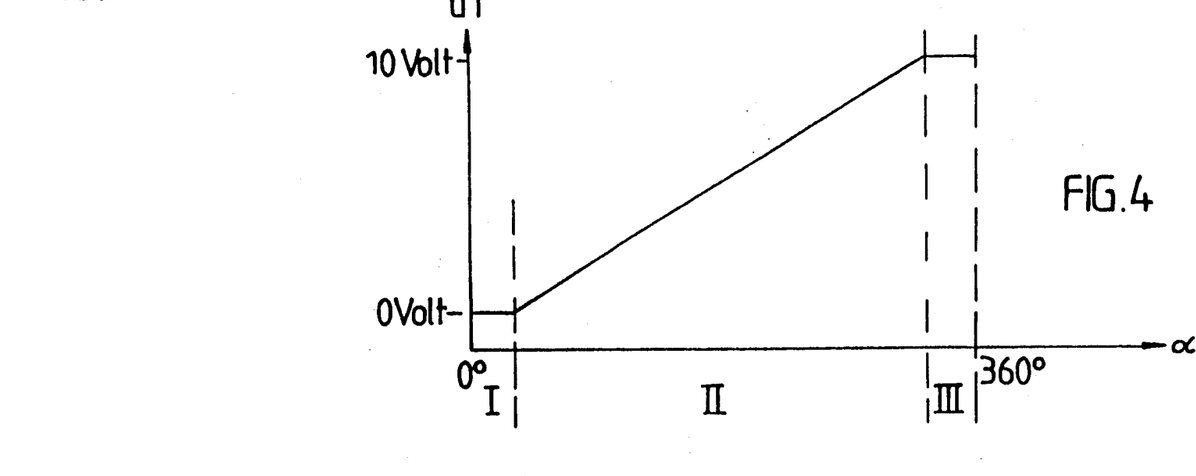
FIG. 4 is a plot diagram of rotational angle against voltage for a continuous potentiometer as used in accordance with the invention.

FIG. 4 shows a rotational angle-to-voltage plot diagram for the potentiometer 8. A non-illustrated corresponding diagram is applicable to the potentiometer 11. The voltage U1 is represented along the ordinate, and the rotational angle of the slider $\alpha$ along the abscissa. It is readily apparent that, in a region I in FIG. 4, in spite of the presence of a rotational angle $\alpha$, there is no change in voltage. Thus, in the region I, the voltage U1 is equal to 0 volts. In a region II, there is a linear increase in voltage from 0 volts to 10 volts (the maximum value of the constant voltage source Ub), as the rotational angle $\alpha$ increases. The region II extends up to a rotational angle $\alpha$ which is smaller than 360 degrees. Adjoining the region II is a region III, extending to $\alpha = 360$ degrees, that is, until a full revolution of the slider of the potentiometer 8 has been completed. In the region III, the voltage U1 remains constant at 10 volts. It is believed to be clear from the plot diagram of FIG. 4 that, in the region I, the slider of the potentiometer 8 is not yet located at the resistance assembly, but rather in the connection region. The resistance assembly is reached only in the region II while, in the region III, the slider is located in the connection area at the other end. Because the two connection areas at the beginning and the end of the resistance assembly must be electrically separated from one another, a voltage-free zone is furthermore to be provided, which can be equated with the potential of 0-volts. This is not reproduced in detail in the drawing, however.

Figure 5:
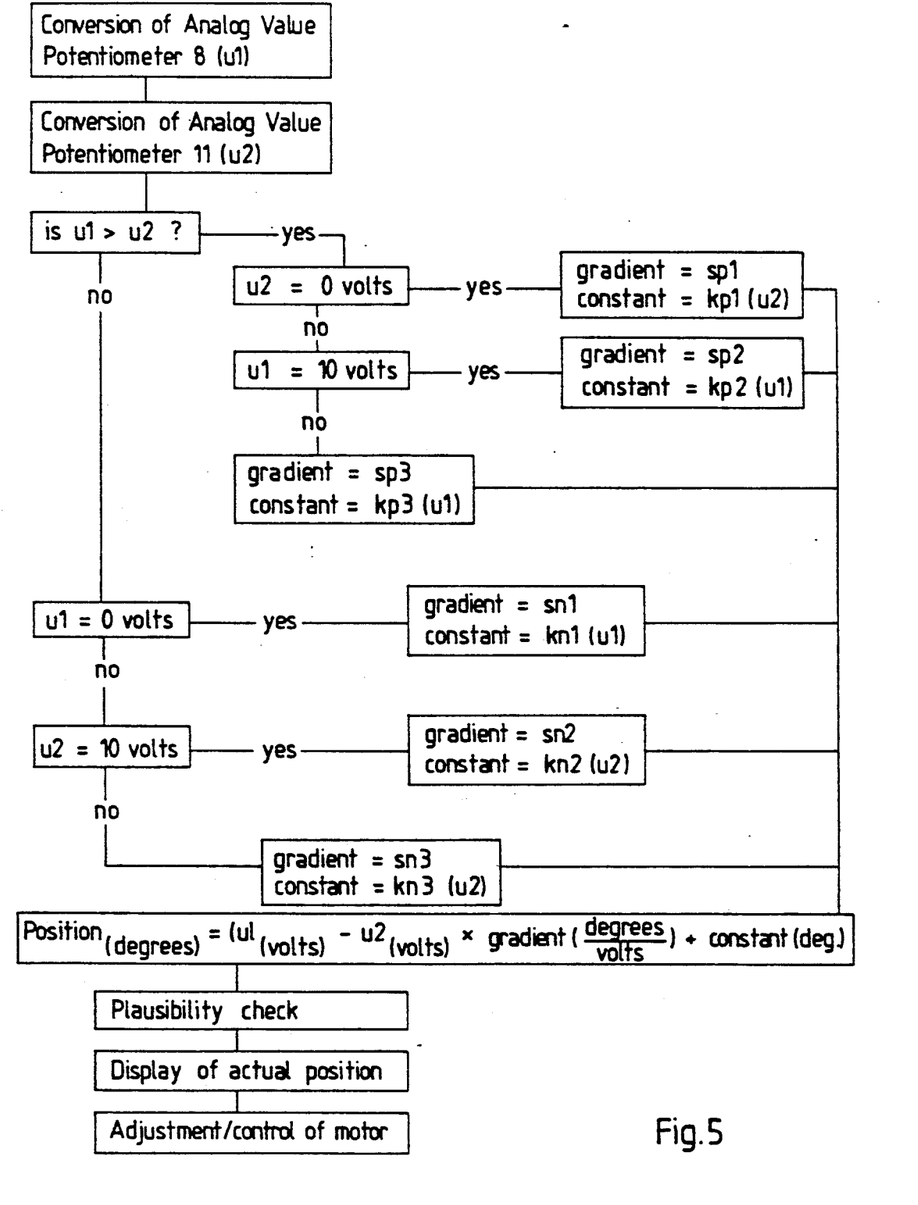
FIG. 5 is a flow chart of the evaluation of the potentiometer values, preferably executed by means of a computer.
Figure 6:
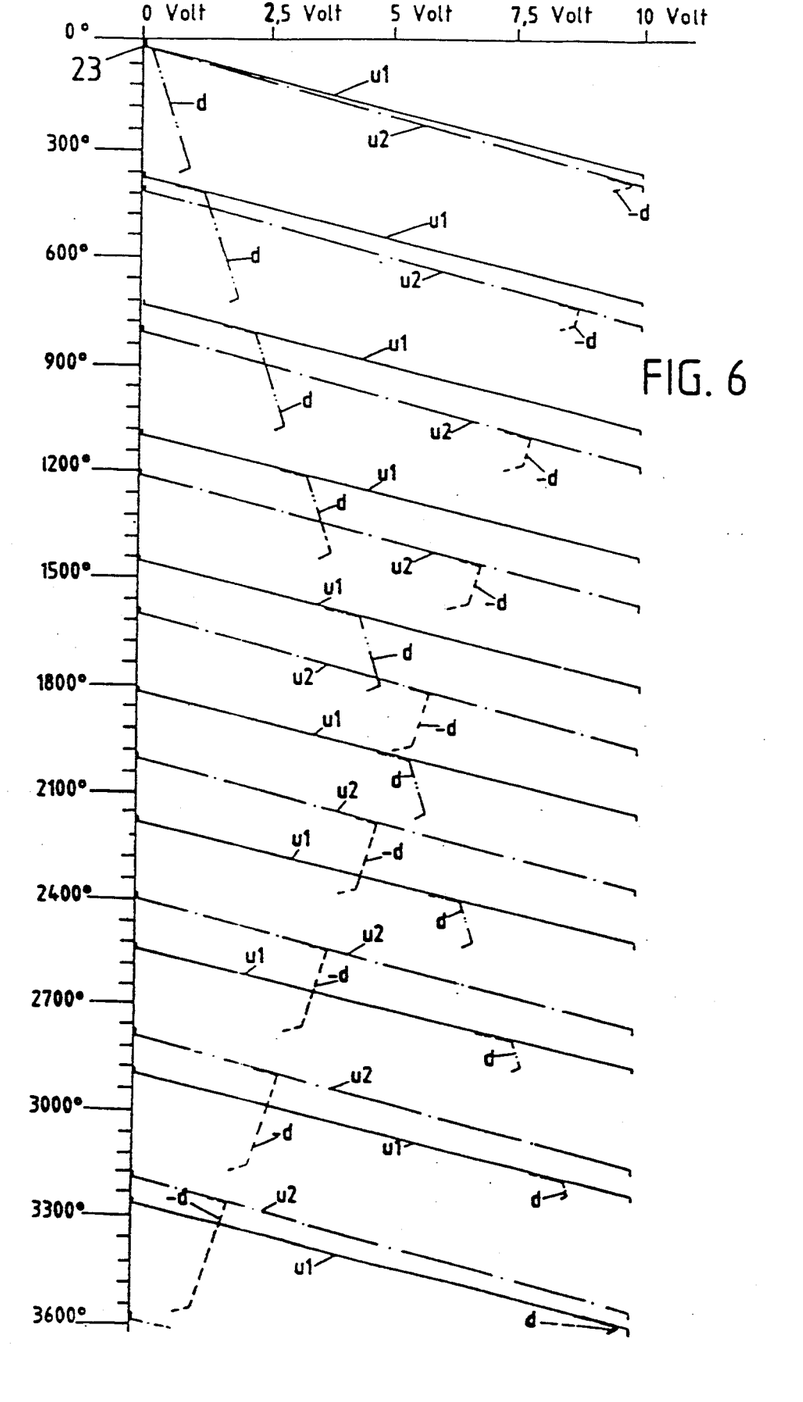
FIG. 6 is a plot diagram of rotational angle against voltage for a total number of complete revolutions of the adjustment drive of x=10.
Figure 7:
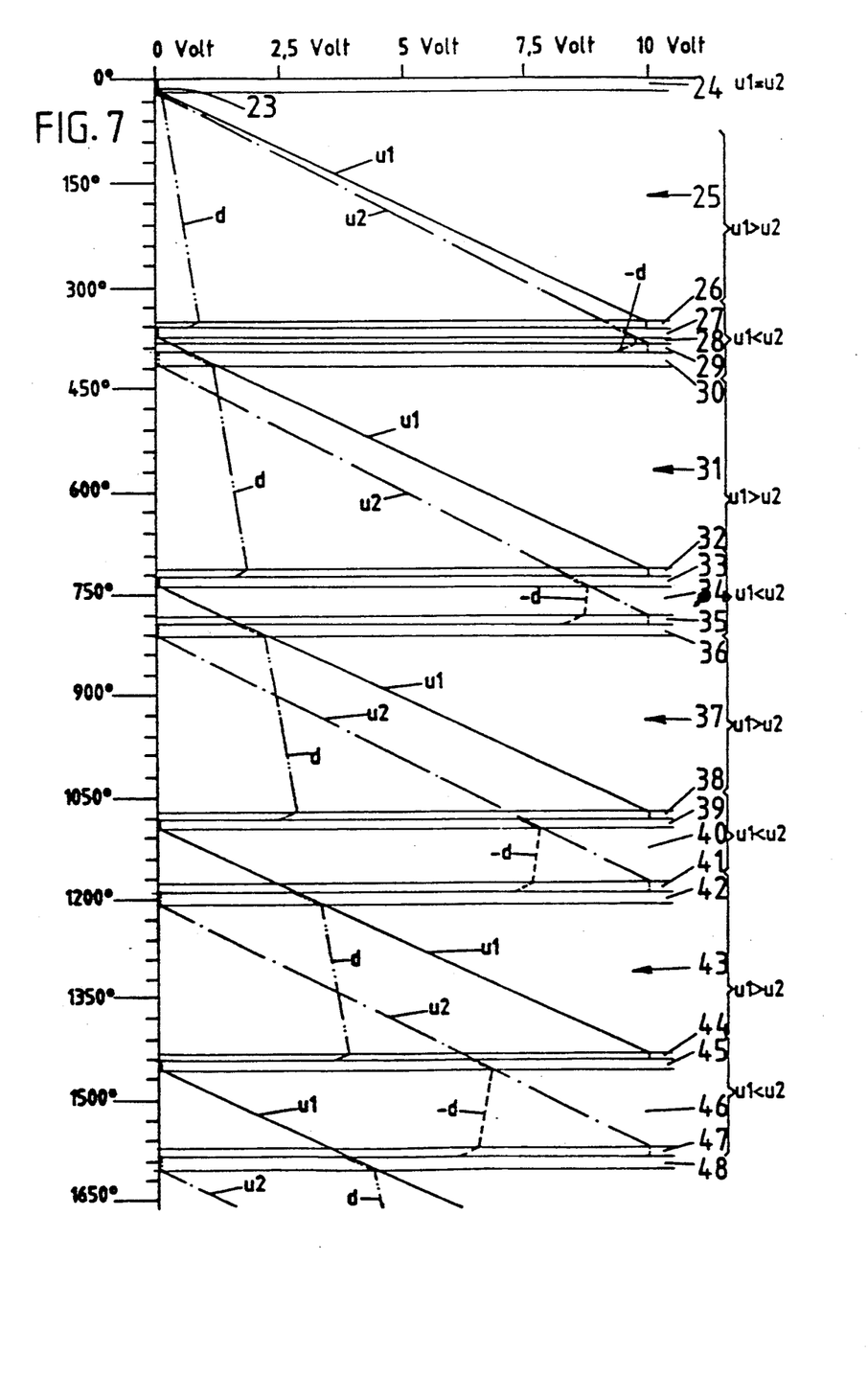
FIG. 7 is an enlarged fragmentary view of the plot diagram according to FIG. 6.

FIGS. 5, 6 and 7 clearly illustrate the evaluation of the output voltages of the potentiometers 8 and 11, as well as the individual voltage curves relative to the respective slider positions:

It is assumed that the slider of the potentiometer 8 passes through the rotational angle $\alpha$ and that the slider of the potentiometer 11 passes through a rotational angle $\beta$. Furthermore, the two potentiometers 8 and 11 are adjusted in a manner that for $\alpha = \beta = 0$ degrees, $U1 = U2 = 0$ volts, that is, both potentiometers are in a position or setting corresponding to the 0-degree setting in FIG. 4.

If the motor 2 is now activated, thereby setting the spur gear drive unit 4 into motion, the voltages U1 and U2 initially retain their values of 0 volts for a given rotational angle $\alpha$ or $\beta$, until they start to increase linearly from 0 volts at a point 23 in FIG. 7. As this course is followed, a voltage difference is formed between the voltages U1 and U2 as a result of the different ratios of transmission with respect to the gear wheel 5. This is identified as a differential value d. Before the rotational angle $\alpha$ of 360 degrees is reached, the voltage U1 assumes its maximum value of 10 volts which corresponds to the amount of the constant voltage source Ub. While the voltage U1 then drops from plus 10 volts to 0 volts in the course of the next part of the cycle (note the plot diagram in FIG. 4), the voltage U2 maintains its trend of increasing linearly for a given rotational angle $\beta$. This means that the difference U1 − U2 is negative in a given range. In the interest of simplicity, this negative range of the differential value d is also represented on the positive voltage scale of FIGS. 6 and 7 as a broken line −d. The differential value d becomes positive again only when, in a further course of the rotational angle, the voltage U2 returns to 0 volts from its maximum value of plus 10 volts. This remains the case until, as appropriate, a reversal or change in the sign of d again occurs, and so forth.

The voltage curves are to be explained in greater detail with respect to FIG. 7, which is an enlarged fragmentary view of FIG. 6 (an elongation or extension of the axis of the rotational angles). Reference is first made again, however, to FIG. 6 from which it can be seen overall that the differential value $d = U1 - U2$ increases from 0 to almost 10 volts, in the course of ten revolutions of the gear wheel 5, and therefore also of the threaded spindle 50, a total of ten partial sections being formed by the transitions of the potentiometers 8 and 11 required by the connections.

Assuming a rotational angle $\alpha$ or $\beta$, respectively, of 0 degrees, FIG. 7 shows a region 24, wherein the voltages U1 and U2 are equal to 0 volts. Adjoining the region 24 is a region 25, wherein the voltages U1 and U2 increase constantly, and which extends to the point at which the voltage U1 has reached 10 volts. In the region 25, the differential value $d = U1 - U2$ correspondingly increases linearly. The region 26 then follows. In the latter region 26, the voltage U1 remains constant at 10 volts, while the voltage U2 continues to increase linearly. Correspondingly, the differential value d reduces linearly in accordance with the increase of the voltage U2 in the region 26. Adjoining the region 26 is a region 27 wherein the voltage U1 drops from plus 10 volts to 0 volts, while the voltage U2, just as in the regions 25 and 26, continues its linear increase. The overall result thereof is that the differential value d becomes negative and, in accordance with the increase in the voltage U2 in this region, it undergoes a negative linear increase until the region 28 is reached. In this region 28, the voltage U1 again begins to increase from 0 volts, while the voltage U2 also continues its linear increase. Because the increase in the voltage U1 in this region is relatively steeper than that of the voltage U2 (due to the differing slopes of the curves of the voltages U1 and U2), the amount of the differential value d, which has thus become negative, reduces. There then follows a region 29, wherein the voltage U2 maintains its maximum value of 10 volts constant, while the voltage U1 increases constantly. This results in a diminution of the negative differential value d, with a slope or gradient which corresponds to the increase in the voltage U1. In the adjoining region 30, the voltage U2 drops back from plus 10 volts to 0 volts, while the voltage U1 increases constantly. As a consequence thereof, the differential value d becomes positive again and increases with a slope or gradient which corresponds to the increase in the voltage U1. This persists until the region 31 is reached, at which the voltage U2 again increases constantly, starting from 0 volts; as a result, in the region 31, both of the voltages U1 and U2 increase constantly, so that the differential value d also increases with a slope or gradient which combines the respective slopes or gradients of the individual voltages. In the following region 32, the voltage U1 assumes the constant value 10 volts thereof, while the voltage U2 further increases continually. The differential value d consequently decreases in accordance with the slope or gradient of the voltage U2. In the adjoining region 33, the voltage U1 drops backs from plus 10 volts to 0 volts, while the voltage U2 increases continually. The differential value d thus becomes negative and increases with a slope or gradient which corresponds to the slope or gradient of the voltage U2. The next adjoining region 34 is distinguished by the fact that the voltage U1, starting from 0 volts, increases continually, yet is smaller than the voltage U2, which also increases continually. Thus, the differential value d is negative and reduces slightly as the rotational angle increases. In the next region 35, the voltage U2 maintains the constant value of plus 10 volts, while the voltage U1, which is smaller in value, increases continually. Thus, there is a continual diminution in the negative differential value. The adjoining region 36 is distinguished by the fact that the voltage U2 jumps from plus 10 volts to 0 volts, while the voltage U1 increases continually. Consequently, the differential value d again becomes positive; it increases with the same gradient or slope as the voltage U1. The region 37 follows wherein the voltages U1 and U2 both increase continually, so that the differential value d also increases with a corresponding slope or gradient. In the next region 38, the voltage U1 remains constant at plus 10 volts; the voltage U2 increases continually, so that there is an overall decrease in the differential value d. In the region 39, the voltage U1 jumps from plus 10 volts to 0 volts, and the voltage U2 increases continually. Because the voltage U1 is then smaller than the voltage U2, the differential value d becomes negative. In the region 40, the voltage U2 continues to rise constantly; this is also true of the voltage U1, although it is smaller. Thus, the differential value d remains negative, decreasing slightly at a constant rate, however. The adjoining region 41 is distinguished by the fact that the voltage U2 remains constant at 10 volts, while the voltage U1 increases linearly; as a result, the negative differential value reduces. The region 42 then shows accordingly that the differential value d again becomes positive, its increase corresponding to the gradient or slope for the voltage U1. In the region 43, the voltages U1 and U2 both show linear increases; the differential value d increases correspondingly. In the succeeding regions 44 to 48, and so forth, the aforedescribed process is repeated correspondingly. Viewed as a whole, it can be seen that, in the regions 25 and 26, as well as the regions 30 to 32 and 36 to 38, and also the regions 42 to 44 and so forth, the voltage U1 is greater than the voltage U2, whereas in the regions 27 to 29, 33 to 35 and 39 to 41, as well as the regions 45 to 47 and so forth, the voltage U1 is smaller than the voltage U2.

A result thereof is that, based upon knowledge of the voltage values U1 and U2, a clear and unequivocal statement may be made with regard to the rotational angle of the control element of the adjustment drive 1.

In order to facilitate the determination of the rotational angle, it is preferable to use the computer 20. The determination of the rotational angle (the position of the adjustment drive) is performed preferably in accordance with the flow chart shown in FIG. 5, from which it can be seen that the computer receives digitized values of the voltages U1 and U2 via the a–d converter 19. If the voltage U1 is greater than the voltage U2, a check is carried out as to whether the voltage U2 is 0 volts or the voltage U1 is 10 volts. If the voltage U2 is 0 volts, there results a slope or gradient sp1 and a constant kp1; if the voltage U1 is 10 volts, the result is a slope or gradient sp2 and a constant kp2. If the voltage U2 is not 0 volts and the voltage U1 is not 10 volts, a slope or gradient sp3 and a constant kp3 are selected by the computer. If the voltage U1 is not greater than the voltage U2, a check is carried out as to whether the voltage U1 is 0 volts. If this is the case, the slope or gradient is sn1 and the constant kn1. However, if the voltage U2 is 10 volts, the slope or gradient sn2 and the constant kn2 are selected. If the voltage U1 is smaller than the voltage U2, but the voltage U1 is not 0 volts and the voltage U2 is not 10 volts, the computer selects the slope or gradient sn3 and the constant kn3. The gradients and the constants mentioned are stored in tabular form in the memory of the computer. Utilizing the slopes or gradients and/or constants found in each case, the position of the adjustment drive can be calculated. This takes place in accordance with the formula:

Position (degrees) = $(U1 \{volts\} - U2 \{volts\}) \times$ gradient $\left(\frac{degrees}{volts}\right) +$ constant (degrees)

The actual position determined in this manner can be displayed. Furthermore, the adjustment procedure described hereinbefore can then take place provided that the actual position deviates or is divergent from the setpoint position. Instead of the adjustment, if necessary, provision can be made for a control.

As an alternative, it is also possible, however, for the computer not to store or provide access to the hereinaforedescribed gradients and constants in tabular form, but instead, that corresponding functions i.e. curve characteristics, be stored in the computer, from which the individual components for position-determining can be derived.

A comparison of FIGS. 5 and 7 establishes that ratios are present in the respective areas which lead unequivocally to a determination of the corresponding slope or gradient and constants. The constant which is to be added in accordance with the formula is obtained purely mathematically from the fact that the characteristic curves of FIG. 7 do not for the greater part pass through the zero point of the coordinate system.

As a result of the course or development of the angles of rotation shown in FIG. 6, similar ratios occur ten times, namely, every 360 degrees. Six different regions can be distinguished:
1. The voltage of the potentiometer 8 is greater than that of the potentiometer 11:
   1.1. The voltage U2 of the potentiometer 11 is 0 volts.
   1.2. The voltage U2 of the potentiometer 8 is in the region of linear increase.
   1.3. The voltage U1 of the potentiometer 8 is 10 volts.
2. The voltage of the potentiometer 8 is smaller than. or of equal magnitude to that of the potentiometer 11:
   2.1. The voltage U1 of the potentiometer 8 is 0 volts.
   2.2. The voltage of the potentiometer 11 is in the region of linear increase.
   2.3. The voltage U2 of the potentiometer 11 is 10 volts.

This division into six different regions or areas results in a clear-cut allocation, without any overlaps or ambiguities.

According to a further development of the invention, it is possible to effect fine corrections with unusually high precision after a given position has been entered upon. The procedure is as follows:

First, a positioning operation is carried out as described hereinabove. The instant the setpoint position is reached, a fine correction may be undertaken by switching over to one potentiometer, either the potentiometer 8 or the potentiometer 11. This means that from then on, only the resistance value of one of the potentiometers is taken into account; preferably, the potentiometer 8 or 11 is selected which is located approximately in the middle position of a linear region or range thereof.

According to the information given above, the total stroke should be 120 mm. As an example, the value of 100 mm is entered upon by means of the positioning procedure described hereinabove. Then, a fine correction of plus/minus 0.1 mm is to take place at about this position (100 mm). This fine correction path of plus/minus 0.1 mm corresponds to a given change of voltage and thus of rotational angle by the selected potentiometer 8 or 11, respectively. The voltage of the selected potentiometer changes by a corresponding voltage difference, according to the fine correction path of plus/minus 0.1 mm. This voltage difference is clearly measurable, whereas this is not the case in the previously described method of operation with the two potentiometers, because this small fine correction difference would result in a voltage change of differential value d which would be so small as to lie within the interference voltage range. Of course, after switching to only one potentiometer, it is no longer possible to determine the absolute rotational angle; rather, it is possible to cover only a relative region or range of fine correction around this previously given rotational-angle value.

Preferably, the analog values (0 to 10 volts) are converted into 4,096 digital values by means of the a-d converter 19.

The foregoing is a description corresponding in substance to German Application P 39 00 270.5, dated Jan. 7, 1989, the International priority of which is being claimed for the instant application, and which is hereby made part of this application. Any material discrepancies between the foregoing specification and the aforementioned corresponding German application are to be resolved in favor of the latter.

I claim:
1. Position determining device for an adjustment device comprising two continuous potentiometers having sliders movable to respective positions determining respective resistance values of said potentiometers, said sliders being drivingly coupled with the adjustment drive so that the respective resistance values determined by the positions of said sliders correspond to a set position of the adjustment drive, means for driving each of said sliders with a respective transmission ratio different from each other so that said potentiometers have respective resistance values different from each other for a given set position of the adjustment drive, and means for determining a differential value between said different resistance values as a measure of the set position of the adjustment drive, said potentiometers, respectively, having connection regions at a starting location and at an end location of respective full measurement ranges thereof, both of said potentiometers having respective drive ratios operative so that only one of said sliders at any time is located in a respective connection region of the respective potentiometer except at a start and an end of the entire measurement range.

2. Position determining device according to claim 1, wherein said potentiometers are constructed as single-pass potentiometers.

3. Position determining device according to claim 1, wherein a ratio of transmission r between said two potentiometers is:

$$r = \frac{n1}{n2}, \text{ and } n1 = x \text{ and } n2 = x - 1 \text{ so that}$$

$$r = \frac{n1}{n1 - 1} = \frac{x}{x - 1},$$

wherein n1 represents the number of revolutions of the slider of one of said potentiometers, mz represents the number of revolutions of the slider of the other potentiometer, and x represents a maximum number of complete revolutions of the adjusting device for a maximum adjusting stroke.

4. Position determining device according to claim 1 including an analog-to-digital converter connected to said potentiometers for receiving said resistance values therefrom, and a computer connected to said analog-to-digital converter for evaluating the position of the adjustment device from the digitized resistance values.

5. Position determining device for an adjustment device comprising two continuous potentiometers having sliders movable to respective positions determining respective resistance values of said potentiometers, said sliders being drivingly coupled with the adjustment drive so that the respective resistance values determined by the positions of said sliders correspond to a set position of the adjustment drive, means for driving each of said sliders with a respective transmission ratio different from each other so that said potentiometers have respective resistance values different from each other for a given set position of the adjustment drive, means for determining a differential value between said different resistance values as a measure of the set position of the adjustment drive, a constant voltage source connected to said potentiometers for registering a respective voltage corresponding to said resistance values, and means for determining a difference of the respective voltage values as a measure of the set position of the adjustment drive, the set position of the adjustment drive being determinable in accordance with the following:

Position (degrees) = $(U1 \{\text{volts}\} - U2 \{\text{volts}\}) \times$ $$\text{gradient} \left( \frac{\text{degrees}}{\text{volts}} \right) + \text{constant (degrees)}$$

wherein u1 is the voltage of one of the potentiometers, u2 is the voltage of the other potentiometer, and the gradient and the constant are respective preset values depending upon whether u1 is greater or smaller than u2, and whether u1 or u2 is equal to 0 or u max, or is not equal to 0.

6. Position determining device according to claim 5, wherein said potentiometers are constructed as single-pass potentiometers.

7. Position determining device according to claim 5, wherein a ratio of transmission r between said two potentiometers is:

$$r = \frac{n1}{n2}, \text{ and } n1 = x \text{ and } n2 = x - 1 \text{ so that}$$

$$r = \frac{n1}{n1 - 1} = \frac{x}{x - 1},$$

wherein n1 represents the number of revolutions of the slider of one of said potentiometers, nz represents the number of revolutions of the slider of the other potentiometer, and x represents a maximum number of complete revolutions of the adjusting device for a maximum adjusting stroke.

8. Position determining device according to claim 5 including an analog-to-digital converterconnected to said potentiometers for receiving said resistance values therefrom, and a computer connected to said analog-to-digital converter for evaluating the position of the adjustment device from the digitized resistance values.

* * * * *